United States Patent [19]

Leitz et al.

[11] Patent Number: 4,629,572
[45] Date of Patent: Dec. 16, 1986

[54] PAINT DETACKIFICATION METHOD

[75] Inventors: Christopher R. Leitz, Devon; Joel S. Jordon, Drexel Hill; Michael S. Dalton, Pittsburgh, all of Pa.

[73] Assignee: Atlantic Richfield Company, Los Angeles, Calif.

[21] Appl. No.: 834,261

[22] Filed: Feb. 27, 1986

[51] Int. Cl.⁴ .................................................. C02F 1/56
[52] U.S. Cl. ..................................... 210/714; 55/85; 210/728; 210/735; 427/331
[58] Field of Search ................ 55/84, 85; 134/38; 210/666, 702, 712, 714, 725, 727, 728, 735, 736, 908; 427/331

[56] References Cited

U.S. PATENT DOCUMENTS

| | | | |
|---|---|---|---|
| 2,267,426 | 12/1941 | Affeck | 427/212 |
| 2,585,407 | 2/1952 | Rives | 106/213 |
| 3,498,913 | 3/1970 | Sellet | 210/735 |
| 3,509,021 | 4/1970 | Woodward | 210/735 |
| 3,515,575 | 6/1970 | Arnold | 106/287.29 |
| 3,861,887 | 1/1975 | Forney | 55/19 |
| 3,990,981 | 11/1976 | Gabel et al. | 252/315 |
| 4,002,490 | 1/1977 | Michalski | 134/38 |
| 4,067,806 | 1/1978 | Maveeri | 55/89 |
| 4,125,476 | 11/1978 | Dean | 134/38 |
| 4,185,970 | 1/1980 | Dean | 55/84 |
| 4,220,456 | 9/1980 | Block | 55/85 |
| 4,380,495 | 4/1983 | Maher | 210/728 |
| 4,440,647 | 4/1984 | Puchalski | 210/725 |
| 4,504,395 | 3/1985 | Harpel et al. | 210/702 |
| 4,541,931 | 9/1985 | Geke et al. | 210/735 |
| 4,564,464 | 1/1986 | Harpel et al. | 210/712 |

FOREIGN PATENT DOCUMENTS 937342  6/1982  U.S.S.R. ............... 210/735

Primary Examiner—Peter Hruskoci
Attorney, Agent, or Firm—Coleman R. Reap

[57] ABSTRACT

Paint spray booth wastes from clear oil-based coating compositions, such as lacquers, which have been collected in a water wash are easily detackified and removed from the wash water by contacting the wastes in the wash water with (1) a water-dispersible polymeric condensation reaction product of a urea or an amino triazine and an aldehyde and (2) a water-swellable clay.

6 Claims, No Drawings

PAINT DETACKIFICATION METHOD

FIELD OF THE INVENTION

This invention relates to a method for detackifying oversprayed paint and more particularly to a method of detackifying particles of oil-based paints which contain no pigment or fillers.

BACKGROUND OF THE INVENTION

Automatic spraying techniques have long been employed for painting large articles such as cars, trucks, refrigerators, etc., and small articles, such as vehicle and equipment parts. The items being sprayed are generally advanced along a conveyor line which passes through paint spray booths where a fine spray of paint is automatically directed at the articles being painted from paint spray guns which are located on one side of the conveyor. Oversprayed paint, i.e. paint which does not contact the article being painted, forms a fine mist of paint in the air space surrounding the painted article. This paint mist must be removed from the air. To accomplish this the contaminated air is pulled to the rear of the paint booth by air exhaust fans which are generally located behind the conveyor. A curtain of cascading water is maintained across the path of the air in such a manner that the air must pass through the water curtain to reach the exhaust fans. As the air passes through the water curtain the paint mist is scrubbed from the air and carried to a sump basin, usually located below the paint spray booth (see U.S. Pat. No. 2,585,407). However the water itself does not detackify the paint and unless it is treated to detackify it, it tends to adhere to the sump and drain surfaces. To prevent clogging of the sump drain and sewer system the accumulated paint must be periodically removed from the sump. This is generally accomplished by shovelling, which is costly and time consuming. It is preferable to detackify the paint so that it will not adhere to the surfaces of the waste paint collection system and to cause the detackified paint particles to coalesce for easy removal from the system. It is very desirable to be able to thoroughly separate the waste paint solids from the water so that the water may be recycled and the paint solids properly disposed of.

Various procedures and techniques have been tried to detackify the paint. For instance, U.S. Pat. No. 3,515,575 discloses contacting the paint with inorganic substances, such as clay, starch, colloidal silica, talc, etc., to detackify it. In particular, this patent dislcoses the use of hectorite, a montmorillonite-type clay, for detackifying paints, including oil-based paints, lacquers and enamels. Other U.S. patents which disclose the use of clays to detackify paint are U.S. Pat. Nos. 2,267,426, 4,125,476, 4,185,970, 4,220,456, 4,380,495 and 4,504,395. Although the clay materials described are somewhat effective for detackifying particles of paints which contain pigments and fillers they leave a lot to be desired in the detackification of clear lacquers.

Organic chemical substances such as polymeric flocculants have also been used to detackify paint overspray in spray booths. These systems are superior to the simple use of clays since they facilitate the coalescence and separation of the paint particles from the circulating water system. U.S. Pat. No. 4,002,490 teaches the use of a water-soluble salt of an amphoteric metal, propylene glycol and a polycationic polymer as a paint detackifying composition. U.S. Pat. No. 3,990,986 describes the use of zinc chloride and a polyelectrolyte at pHs above 8 to detackify paint spray booth wastes. This patent also discloses the combination of a metal salt which forms an insoluble hydroxide above pH 7, a primary amino alcohol and a polyether to clarify and detackify paint spray booth wastes. U.S. Pat. No. 4,440,647 discloses the use of a water-dispersible polyamideepichlorohydrin resin, a polymer formed from hexamethylene diamine and ethylene dichloride, and an amphoteric metal salt. This patent also describes the use of ferric chloride in combination with cationic polymers to treat suspended matter comprising water and oil-based paints. U.S. Pat. No. 4,067,806 discloses the use of blends of a terpolymer of dialkyldimethylammonium halide, N-vinyl-2-pyrrolidone and acrylamide and a water-soluble salt of an amphoteric metal, such as aluminum chloride, to reduce the tackiness of over-sprayed paint and lacquer solids in paint spray booths.

The prior art methods of detackifying paint particles is easily applied to pigment-containing latex-based paints and some of these techniques have been applied to pigment-containing and/or filler-containing oil-based paints. In these paints the pigment and/or filler particles serve as a base for agglomerating and detackifying the paint. However, in the case of pigment-free and filler-free oil-based paints, such as clear lacquers, there are no solids to provide a base on which the detackifying agents can act. New solids-free coating materials are being widely used for coatings for automobiles because of the increased protection that they provide to the finish of the automobile. However, these coating materials are more difficult to detackify and remove from spray painting system.

OBJECTS OF THE INVENTION

The present invention discloses a system of detackifying components which is particularly effective for detackifying pigment and filler-free clear coating materials and solids-free coating materials which contain soluble dyes and colorants.

The objects of the invention are to remove particles of oil-based coatings which contain no solids, i.e. pigments or fillers, from the air, to detackify the coating particles, to prevent the coating particles from clogging up the water circulating system which is used to scrub the coating particles from the air and to aid in the coalescence of the detackified particles so that they may be easily and efficiently removed from the water circulating system.

SUMMARY OF THE INVENTION

The foregoing objects are achieved as follows: Waste particles of clear or colored pigment-free and filler-free coatings which are captured in the water spray system of coating spraying booths are detackified and coalesced by contacting the particles with a two-component system comprised of a (1) water-dispersible polymeric condensation product of an aldehyde and at least member selected from ureas, amino triazines and mixtures of these and (2) a water-swellable clay.

DETAILED DESCRIPTION OF THE INVENTION

The coating particles which are unexpectedly detackified and coalesced by the treating system of the invention are those resulting from solids-free oil-based coating compositions. These compositions are used to provide a clear or colored protective coating on the surfaces of vehicles, such as automobiles, and articles such as refrigerators, washers, etc., onto which have been sprayed a pigmented paint. The clear coating provides a high luster and a durable finish which resists scratching and chipping. Clear coating compositions, or clear coats, as they are commonly referred to, are generally oil-based lacquers which are free of insoluble pigments and other fillers, such as titanium dioxide, calcium oxide, etc. They may contain a soluble dye, but they contain no insoluble solids. The invention can be applied to the detackification of any oil-based solids-free coating composition. For purposes of this description, the coating compositions will be referred to simply as lacquers.

As noted above, the absence of insoluble pigments and fillers compounds the task of detackifying the lacquer particles since there is no solids substrate to serve as a base for detackifying agents. In the present invention, the clay particles appear to provide the base onto which the lacquer particles can be coalesced. Thus, the combination of the condensation polymer described below and the water-swellable clay provides a unique solution to the problem of detackifying lacquers. The discovery that this combination provides superior lacquer detackification is surprising since neither of the components of the combination provide satisfactory results when used alone.

The water-dispersible condensation resins usable in the invention are reaction products of aldehydes and nitrogen-containing compounds which condense with aldehydes to form thermosetting resins. The preferred aldehyde is formaldehyde, although other aldehydes, such as acetaldehyde, acrolein, crotonaldehyde, etc. may be used. Formaldehyde may be used in the gaseous state or in one of its polymer forms, such as paraformaldehyde or formalin.

The nitrogen-containing resin-forming compound may be a urea or an amino triazine, such as urea, melamine, thiourea, guanidine, dicyandiamide, dicyanamidine, alkylureas, cyclic alkyleneureas, aminotriazines other than melamine, such as melam, melem, ammelide, and ammeline, substituted melamines, such as butylmelamine or phenylmelamine, guanamines, such as acetoguanamine, benzoguanamine, tetrahydrobenzoguanamine, stearoguanamine, etc. The preferred nitrogen-containing resin-forming compounds are urea, melamine and mixtures of these. The preferred resins are urea-formaldehyde resin, melamine-formaldehyde resin and urea-melamineformaldehyde resin. In this discussion the nitrogen compound will simply be referred to as melamine, and formaldehyde will be used as representative of the aldehyde component.

Suitable water-dispersible melamine-formaldehyde resins are prepared by reacting formaldehyde and melamine in the ratio of about 1 to 10 and usually about 2 to 8 moles of formaldehyde per mole of melamine. The product may be made cationic by reaction with an acid such as hydrochloric acid. The preparation of the melamine-formaldehyde resin is not a part of the invention. Any of the well-known melamine-formaldehyde products available on the market may be used in the invention or, if desired, particular melamine-formaldehyde resins may be made. The preparation of typical useful melamine-formaldehyde resins is described in U.S. Pat. Nos. 2,345,543, 2,417,014, 2,564,925, 2,485,079, 2,485,080, 2,986,489, 3,117,106, 3,428,607, 3,484,837 and 3,716,483 and Canadian patent 1,012,666, the disclosures of which are incorporated herein by reference.

The melamine-formaldehyde resin is cured sufficiently to render the product water-dispersible but is not cured so hard as to form an insoluble and infusible product. The melamine-formaldehyde resin is usually used in the form of a colloidal suspension.

The water-swellable clay used in the invention may be any of the natural or modified clays which swell when they come into contact with water. Water-swellable clays usable in the invention are generaly of the smectite or montmorillonite type. These clays are crystalline clays which have three layers. Typical members of this genus include montmorillonite, bentonite, hectorite, saponite, etc. These clays are described in detail in Kirk-Othmer Encyclopedia of Chemical Technology (third edition), John Wiley and Sons, Inc., New York, N.Y., Volume 6, 1979, pp 197–200. U.S. Pat. No. 4,504,395, mentioned above, also contains a description of useful water-swellable clays. The disclosures of these publications are incorporated herein by reference.

The invention is further described with reference to a lacquer spraying operation. In a typical spray booth operation the water wash system is a circulating system. Water is pumped from a main sump through piping to water wash units located in paint or lacquer spray booths. In the wash units the water is discharged through nozzles located near the top of each spray booth to form a continuous vertical curtain as it drops into a collection sump located beneath the spray booth floor. The cascading water entraps tiny paint or lacquer particles and carries them into the spray booth collection sump. Water is pumped from the collection sumps back to the main sump. The lacquer particles are detackified and coalesced as they come into contact with the additives of the invention. The detackified lacquer-containing waste water is removed from the water wash system and sent to a treatment facility wherein the detackified and coalesced lacquer particles are separated from the wash water and disposed of. The waste water can be removed from the water wash system periodically or continuously. For example, a small stream of the circulating water can be continuously removed and sent to a lacquer skimming unit. The clarified water can then be recirculated to the water wash system.

Other paint detackifiers may be used in combination with the detackifiers of the invention if desired. For example, water-dispersible polyamide-epichlorohydrin resins and polymers prepared by the reaction of a polymethylene diamine and ethylene dichloride can be used in combination with the melamine-formaldehyde and clay. Other polymers which can be used in addition to the detackifying system of the invention include polyquaternary amine polymers, such as diallyldialkylammonium halide homopolymers. The latter polymers are described in detail in copending U.S. application Ser. No. 747,499, filed June 19, 1985. It is emphasized however, that these additional polymeric additives are not required in the invention.

The water-dispersible melamine-formaldehyde resin and the clay are preferably added separately to the circulating water to avoid coagulation of these components. When these components are added separately to the system they are more easily dispersed in the water and there is less chance of coagulation before contact is made with the lacquer particles. The clay can be added as a dry powder or as a slurry in water. The water-dispersible resin is usually added as a slurry, since it is easier to handle in this form.

The amounts of clay and water-dispersible melamine-formaldehyde resin added to the system is not critical. In general the amounts of these components added to the system will depend upon the quantity and nature of the lacquer caught in the water spray system. The clay is usually added in amounts to maintain at least 10 parts of clay per million parts of water (ppm) in the system. It is usually preferred to maintain a clay concentration of at least 50 ppm. The amount of clay present in the system may exceed 10,000 ppm but it generally does not. The clay concentration in the water is usually in the range of about 10 ppm to about 10,000 ppm and more often in the range of about 50 to about 5000 ppm, based on the weight of water.

The concentration of the water-dispersible melamine-formaldehyde resin is usually maintained lower than the concentration of clay since it is very effective. In general the resin is maintained at a concentration of at least 5 ppm and preferably at least 10 ppm. The resin can be maintained at concentrations of up to 5000 or more but is usually maintained in the range of about 5 to about 5000 ppm and most often in the range of about 10 to about 1000 ppm.

The clay and water-dispersible resin are gradually depleted as they detackify the lacquer particles. They can be replenished intermittently or on a continuous basis, whichever is preferred.

Other additives can be added to the circulating water system, if desired. For example, it may be desirable to add surfactants, defoamers or water softeners to the circulating water.

The detackification system disclosed in this invention can also be used to detackify both oil-based paints and water-based paints. It is particularly effective for detackifying oil-based high solids enamels.

The invention is further illustrated in the following examples, in which parts and percentages are expressed on a weight basis, unless otherwise indicated.

EXAMPLE I (Comparative)

Into a 3 gallon recirculating paint spray booth equipped with a water curtain was added 11.3 ml (1000 ppm) of a 6 weight percent aqueous dispersion of a water-dispersible melamine-formaldehyde resin (sold by ChemLink, Inc. under the trademark 1PC® 6115). A clear coat lacquer, free of insoluble pigments and fillers, was sprayed onto the water curtain at a rate of 4.0 ml/min for 30 minutes at which time a total of 1.0 weight percent lacquer had been sprayed into the water. The recirculation was then stopped and the paint was allowed to float to the surface. Precleaned mild steel and 304 stainless steel coupons were dipped into the lacquer scum and then rinsed with tap water to test for "tackiness" of the paint. Then some lacquer scum was removed, rolled into a ¼" ball and worked until it was tacky. Properly conditioned lacquer will not retackify upon working and will remain solid. The dosage of melamine-formaldehyde used in this example (1000 ppm) was sufficient to prevent the lacquer from sticking to the 304 stainless steel coupons, but it stuck somewhat to the mild steel. Furthermore, the mass became retackified upon working. Overall, the results were considered marginal.

EXAMPLE II (Comparative)

Using the method outlined in Example I, 22.6 ml (2000 ppm) of the 6 percent melamine-formaldehyde dispersion was added to the water. This time, the lacquer scum did not adhere to either the mild steel or the 304 stainless steel. It became tacky upon reworking but not as tacky as the scum in Example I. In this case, the results were considered better than marginal, but still short of optimum.

EXAMPLE III (Comparative)

Using the method outlined in Example I, 11.3 grams (1000 ppm) of water-swellable Bentonite clay was added to the water. The lacquer scum adhered to both the mild steel and the 304 stainless steel. Similar results were encountered using 22.6 grams (2000 ppm) of clay, but in this case the lacquer scum did not become as tacky upon working. Overall, the results were considered poor for the 1000 ppm clay run and marginal for the 2000 ppm clay run.

EXAMPLE IV

Using the method outlined in Example I, 11.3 ml (1000 ppm) of the 6 percent melamine-formaldehyde dispersion and 11.3 grams (1000 ppm) of bentonite clay were added to the water. The lacquer scum did not adhere to either the mild steel or the 304 stainless steel and did not retackify upon working. Overall, the results were considered good. A repeat of the above test using 17.0 ml (1500 ppm) of 6 percent melamine-formaldehyde dispersion and 17.0 grams (1500 ppm) of bentonite clay produced excellent detackification.

A comparison of the Example IV results with the results obtained in the other examples shows that the use of the lacquer detackification system of the invention presents a very significant improvement over the use of either of the components of the detackifier system alone.

Although the invention has been described with particular reference to specific examples, it is understood that modifications are contemplated. For instance, the mixtures used in the invention can be used to detackify other oil-based coatings such as paints and enamels. The scope of the invention is limited only by the breadth of the appended claims.

What is claimed is:

1. A process for detackifying spray booth wastes comprised of oil-based coating particles which are substantially free of insoluble pigments and fillers which have been collected in a water wash stream and clarifying the waste-containing water wash stream comprising
   (1) adding to and maintaining in the water wash stream (a) at least about 5 ppm of at least one water-dispersible polymeric condensation reaction product of at least one polyfunctional compound selected from ureas and amino triazines and at least one aldehyde, and (b) at least about 10 ppm of at least one water-swellable clay,
   (2) removing the detackified coating particle wastes from the water wash stream.

2. The process of claim 1 wherein said water dispersible polymeric condensation reaction product is selected from urea-formaldehyde resins, melamine-formaldehyde resins, urea-melamine-formaldehyde resins and mixtures of these.

3. The process of claim 2 wherein the water-dispersible clay is selected from bentonite, montmorillonite, hectorite, and mixtures of these.

4. The process of claim 3 wherein the water-swellable clay and water-dispersible resin in the wash water are maintained at concentrations of at least 50 ppm and 10 ppm, respectively.

5. The process of claim 4 wherein the water-swellable clay is bentonite and the water-dispersible resin is melamine-formaldehyde resin.

6. The process of claim 1 wherein the water-dispersible clay is smectite.

* * * * *